United States Patent
Yalamanchi et al.

(10) Patent No.: US 9,244,981 B2
(45) Date of Patent: Jan. 26, 2016

(54) RESOURCE DESCRIPTION FRAMEWORK SECURITY

(75) Inventors: Aravind Yalamanchi, Nashua, NH (US); Souripriya Das, Nashua, NH (US); Jayanta Banerjee, Nashua, NH (US); John Thomas, Colorado Springs, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2148 days.

(21) Appl. No.: 12/317,858

(22) Filed: Dec. 30, 2008

(65) Prior Publication Data

US 2010/0169966 A1 Jul. 1, 2010

(51) Int. Cl.
*G06F 17/30* (2006.01)
*G06F 21/62* (2013.01)

(52) U.S. Cl.
CPC ...... *G06F 17/30507* (2013.01); *G06F 21/6245* (2013.01)

(58) Field of Classification Search
None
See application file for complete search history.

(56) References Cited

U.S. PATENT DOCUMENTS

| 5,991,879 | A | * | 11/1999 | Still | 726/1 |
| 8,276,192 | B2 | * | 9/2012 | Anderson et al. | 726/4 |
| 2001/0023421 | A1 | * | 9/2001 | Numao et al. | 707/9 |
| 2005/0246338 | A1 | * | 11/2005 | Bird | 707/9 |
| 2005/0289342 | A1 | | 12/2005 | Needham et al. | |
| 2006/0005228 | A1 | * | 1/2006 | Matsuda | 726/1 |
| 2007/0288247 | A1 | * | 12/2007 | Mackay | 705/1 |
| 2009/0265278 | A1 | * | 10/2009 | Wang et al. | 705/54 |
| 2010/0046029 | A1 | * | 2/2010 | Suzuki et al. | 358/1.15 |
| 2010/0049687 | A1 | * | 2/2010 | Patten et al. | 706/47 |

* cited by examiner

*Primary Examiner* — Christopher Revak
(74) *Attorney, Agent, or Firm* — Kraguljac Law Group, LLC

(57) ABSTRACT

Systems, methods, and other embodiments associated with resource description framework (RDF) security are described. One example method includes generating, based on sensitivity labels associated with the contents of a triple in an RDF record, a sensitivity label. The example method may also include comparing the sensitivity label to an access label associated with an entity requesting an action associated with the record to be performed. The example method may also include performing the action upon determining that the entity has sufficient permission to request the action.

20 Claims, 9 Drawing Sheets

RESOURCE DESCRIPTION FRAMEWORK SECURITY

BACKGROUND

Data security is a primary concern in some fields. For example, in the medical field, the Health Insurance Portability and Accountability Act (HIPAA) regulates how a patient's medical records can be accessed. In another example, a company may have authorization levels and departmental restrictions that control how employees are able to access information related to the company's projects. Conventionally, a relational data model, where data is contained in rows of one or more tables, may be used to store data. To prevent improper use of this stored data, data protection may be provided by a combination of row level and column level security labels. These labels may control access to the corresponding data. A user querying for data may have an access label. A user may be given an access label by an administrator based on, for example, the role of the user in the company. The access label may be compared with data sensitivity labels associated with data the user attempts to access. The user may then be provided with the requested data if the access label associated with the user meets or exceeds a threshold dictated by the row level and/or column level sensitivity labels associated with the data.

Table-based data structures, as described above, are conventionally used for storing highly structured data. In situations where the data is less structured, and/or the structure is not known in advance, table-based storage may not be suitable. For example, in a database where information is sparse, the relational model may not efficiently handle some queries. In another example, a company may find it advantageous to be able to quickly associate properties with individual entries in a database without multiplicatively increasing the storage requirement of the database. In the above examples, a database using the resource description framework (RDF) data model for data storage may be more efficient.

Conventional databases using the RDF model contain a series of records. An RDF record may include an RDF triple comprising a subject value, an object value, and a predicate value. The predicate value may describe a relationship between the subject value and the object value. An RDF record may also include other information associated with the triple (e.g. creation date, creator, modification information, etc.). RDF databases provide limited data security capabilities, which in turn limits their applicability for use in a broader array of tasks.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
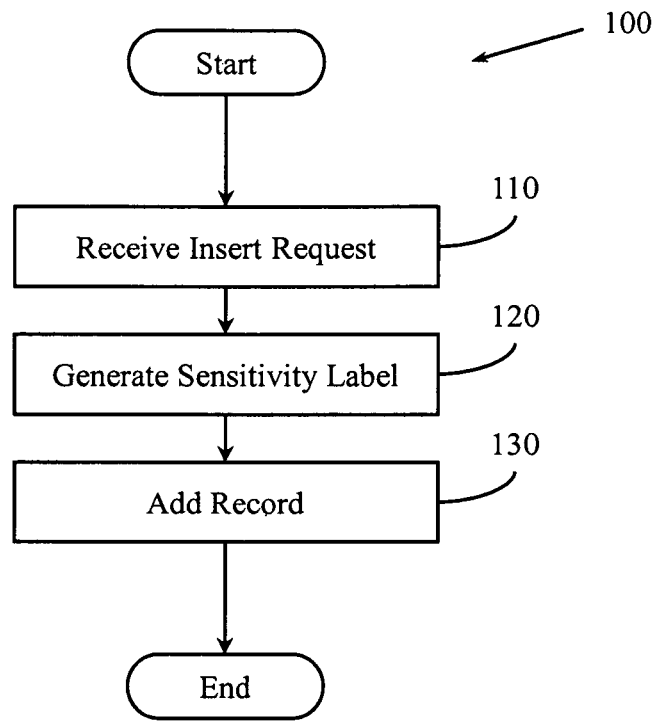
FIG. 1 illustrates one embodiment of a method associated with RDF security.

Typically, RDF databases may not provide data security, for example, by managing sensitivity labels, that would make them appropriate for a broader array of tasks. This may be in part because it may be difficult to secure data associated with an individual triple in a record without affecting other unrelated records in the database. Further, RDF databases allow additional relationships to be inferred from multiple triples. Selecting an appropriate sensitivity label for an inferred relationship may also be a limiting factor in the use of the RDF data model.

Example systems and methods associated with resource description framework (RDF) security are described. One example method includes the ability to set a sensitivity label for each resource in the RDF repository and restrict its usage, in asserting new triples as well as in forming a result set for user queries, based on its position in each triple. A resource is considered a component of an RDF triple when it appears in the triple's subject, predicate or object position. The example method includes generating a sensitivity label when a record containing the triple is added to or modified in an RDF database. The sensitivity label may be derived from sensitivity labels associated with component resources of the triple. Sensitivity labels associated with these resources may facilitate restricting the usage of these resources in the database.

For example, when an attempt is made to create a record with a new triple containing a resource, one example method may determine whether the entity creating the record is permitted to access the resource. Further, a sensitivity label may be generated for the triple by examining sensitivity labels associated with components of the triple. For example, a resource identified by a subject value may have a first set of restrictions, a resource identified by a predicate value may have a second set of restrictions, and a resource identified by an object value may have a third set of restrictions. Generating a sensitivity label for a triple that includes the subject value, the predicate value, and the object value may include selecting the set of restrictions that provides the greatest security for the resulting triple. Generating the sensitivity label may also include combining the three sets of restrictions to create a sensitivity label that covers all the restrictions imposed by the individual sets. A record including the triple and the sensitivity label may then be inserted into the database. In another example method, access permissions may be checked when an entity attempts to access a record containing a triple associated with a sensitivity label. Thus, access to a triple with a sensitivity label may be restricted to entities that have appropriate access privileges.

Sensitivity labels associated with resources may facilitate restricting entities with insufficient access privileges from creating new records containing those resources. Thus, when an entity attempts to add a record to the RDF database, one example method may determine whether the entity has sufficient access permission to perform the addition based on sensitivity labels associated with component resources in the triple of the record being added. If the entity is found to not have sufficient permission to insert the record, the addition may be blocked. If the entity is found to have sufficient permission, the example method may perform the requested addition by adding a record to the RDF database. This record may contain a triple and a sensitivity label generated based on sensitivity labels associated with components of the triple. In one example, the sensitivity label may be generated to meet and/or exceed sensitivity labels associated with the resources. This record, containing both the sensitivity label and the triple, may allow requests that identify the triple to simply compare an access label associated with a requester to the sensitivity label without having to regenerate the label. However, if sensitivity labels associated with subject values, predicate values, and object values are regularly modified, a new sensitivity label may be generated when a triple is accessed. A person having ordinary skill in the art can see how there may be other situations in which it may be desirable to re-generate a sensitivity label when a triple is accessed.

Some databases using the RDF data model have the additional functionality of allowing triples and/or records to be derived when a set of triples and/or records completes a pattern. For example, if a first triple identifies John as the child of Jane, and a second triple identifies Jane as the sister of Sandra, a third triple could be derived identifying Sandra as the aunt of John. In some cases, a record containing the inferred triple may be automatically added to an RDF database. One example method describes generating an appropriate sensitivity label for a derived triple based on a guideline identified by the pattern. Thus, access to inferred triples may also be restricted to users with appropriate access labels. This may provide a uniform access control mechanism that may secure both triples that are explicitly added to a database, and triples that are inferred.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: static RAM.
ROM: read only memory.
PROM: programmable ROM.
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

The terms "contain", "store", and so on, as employed herein (e.g., a data store to store a value, a signal containing a datum), are not intended to limit a storing element or a containing element to directly hold a stored element or a contained element. A storing element may hold an identifier (e.g., a pointer, a reference, a handle) that indicates a location of a stored element. A storing element may also hold an identifier that indicates a location of a data structure that holds the stored element.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates one embodiment of a method 100 associated with resource description framework (RDF) security. Method 100 includes, at 110, receiving an insert request. The insert request may identify a subject value, a predicate value, and an object value. The predicate value may describe a relationship between the subject value and the object value. The insert request may be received from an entity. The entity may be a user, a logic, and so on. For example, an insert request may identify "John" as a subject value, "123456789" as an object value, and "has credit card number" as a predicate value, thereby signifying that John has a credit card numbered 123456789.

Method 100 also includes, at 120, generating a sensitivity label. The sensitivity label may be generated based on a sensitivity label associated with the subject value, a sensitivity label associated with the predicate value, and/or a sensitivity label associated with the object value. The three sensitivity labels may be different sensitivity labels. The sensitivity label associated with the subject value, the sensitivity label associated with the predicate value, and the sensitivity label associated with the object value may be obtained from a sensitivity label data store. This data store may associate values representing RDF resources with sensitivity labels, and may be maintained by a security administrator or a privileged user. For example, the "John" value may be associated with a first sensitivity label limiting information in triples containing the "John" value to be viewable and/or modifiable by only John and his parents. Further, the "has credit card number" value may be associated with a second sensitivity label limiting information in triples containing the "has credit card number" value to be viewable and/or modifiable by only the named person and that person's banks. In one example, generating the triple sensitivity label may include selecting the sensitivity label associated with the subject value, the sensitivity label associated with the predicate value, or the sensitivity label associated with the object value. The selection may be based, for example, on which sensitivity label has the most restrictive security. In another example, generating the triple sensitivity label may include combining a portion of the sensitivity label associated with the subject value, a portion of the sensitivity label associated with the predicate value, and/or a portion of the sensitivity label associated with the object value. The portions may be selected and combined to provide the triple sensitivity label the most restrictive security. Thus, a triple sensitivity label generated for a triple containing both the "John" value and the "has credit card number" value may signify that only John should be able to view and/or modify the triple. A person having ordinary skill in the art can see how additional combinations of sensitivity labels and/or portions thereof may be combined to generate a triple sensitivity label.

Method 100 also includes, at 130, adding an added record to an RDF database. The added record may be added to the RDF database by inserting the added record into the RDF database and/or updating a record in the RDF database. The added record may include the triple sensitivity label and a triple comprising the subject value, the predicate value, and the object value. In one example, the record may be added upon determining that an access label associated with the entity satisfies a security standard determined by the triple sensitivity label. Thus, an error may be returned if the access label associated with the entity does not satisfy the security standard determined by the triple sensitivity label. In another example, if a triple in a record is being modified, a sensitivity label associated with this triple may be compared to an access label associated with the entity to determine if the entity has sufficient permission to overwrite the original triple. This may be in addition to determining if the entity has permission to perform the modification with regard to the triple being added.

By way of illustration, John may need to change his credit card number in a database. Upon requesting the modification, a triple sensitivity label may be compared to John's authorizations at which point the modification would be approved. However, if a person who is not John were to request the modification, that person would likely not be found to have sufficient permission and the change would not be authorized. While using a triple sensitivity label to authorize access to a triple in an RDF record is described, a person having ordinary skill in the art can see how the triple sensitivity label may be utilized to authorize access to portions of the RDF record that are not the triple.

While FIG. 1 illustrates various actions occurring in serial, it is to be appreciated that various actions illustrated in FIG. 1 could occur substantially in parallel. By way of illustration, a first process could receive an insert request, a second process could generate a triple sensitivity label, and a third process could add a record to an RDF database. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 8:
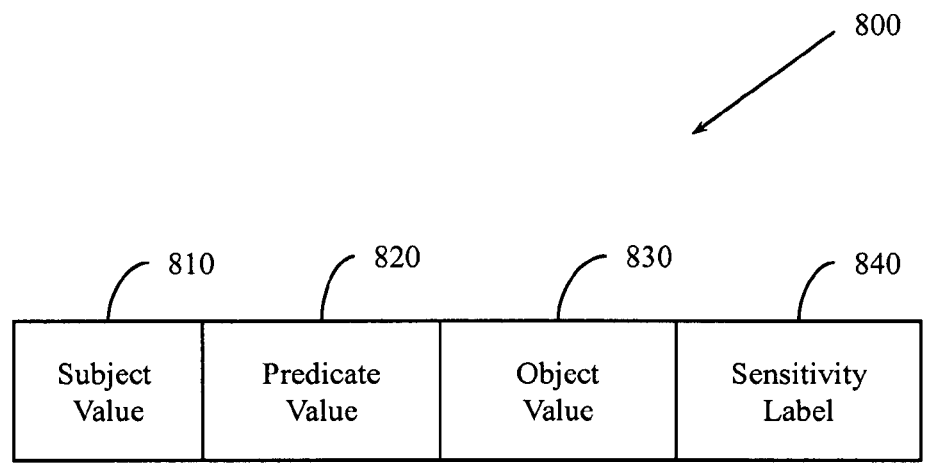
FIG. 8 illustrates one embodiment of a an RDF record.

In one example, data structures may be constructed that facilitate storing data on a computer-readable medium and/or in a data store. Thus, FIG. 8 illustrates how a computer-readable medium may store an RDF record as a data structure 800 that includes, a subject field 810 containing data representing a subject value of a triple, an predicate field 820 containing data representing an predicate value of the triple, and a object field 830 containing data representing object value of the triple. With this "raw" data available, the RDF record may also include a triple sensitivity field 840 containing data representing a triple sensitivity label that is derived from data located in the subject field 810, the predicate field 820, and/or the object field 830. The triple sensitivity label may control access to the triple and its components. While four fields are described, it is to be appreciated that a greater and/or lesser number of fields could be employed.

Figure 9:
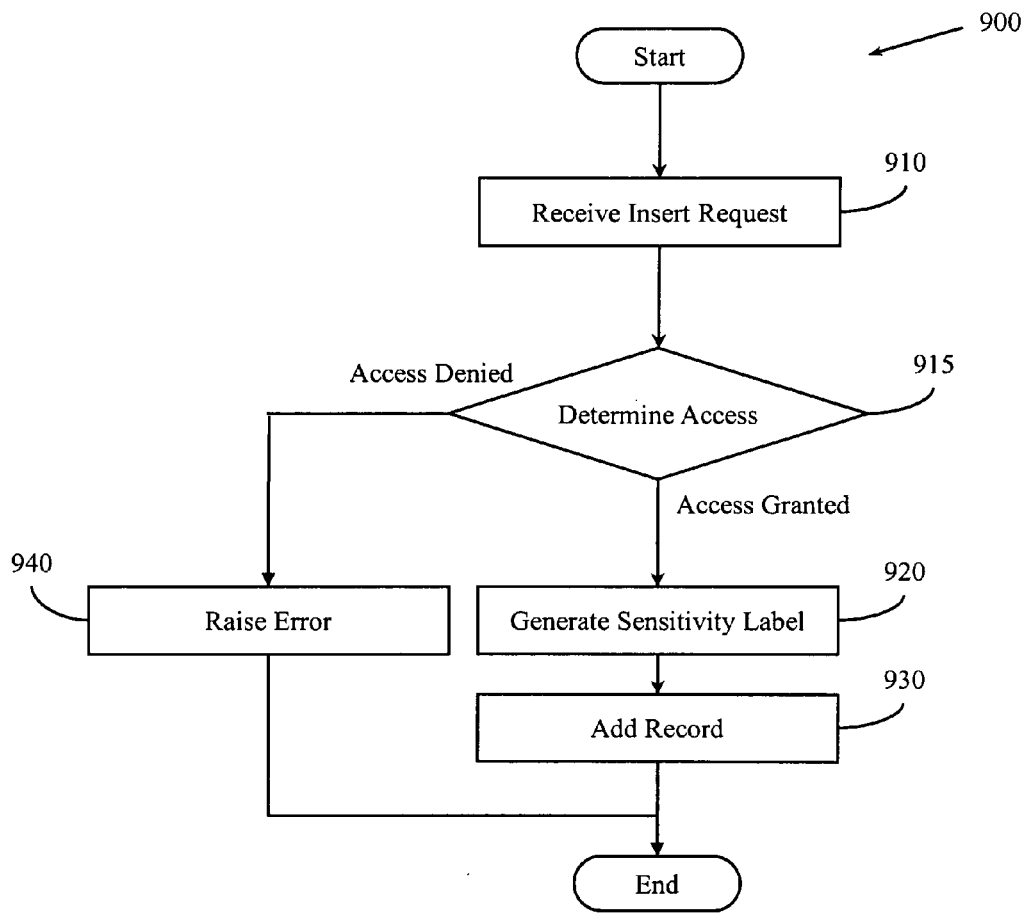
FIG. 9 illustrates one embodiment of a method associated with RDF security.

FIG. 9 illustrates one embodiment of a method 900 associated with RDF security. Method 900 includes several actions similar to those described in connection with method 100 (FIG. 1). For example, method 900 includes receiving an insert request at 910, generating a sensitivity label at 920, and adding a record at 930. However, method 900 includes additional actions.

Method 900 includes, at 915, determining whether the entity has sufficient access to manipulate the resources identified by the insert request. The entity may be found to not have sufficient access if an access label associated with the entity does not satisfy a security standard determined by sensitivity labels associated with the resources of which the entity is requesting manipulation. If the entity is found to have sufficient access, method 900 may proceed as explained above, by generating a sensitivity label at 920 and adding a record to an RDF database at 930. If, however, the entity is not found to have sufficient access, method 900 may proceed by raising an error at 940. In one example, raising an error at 940 may include notifying the entity that the entity does not have sufficient access to manipulate the resources identified in the insert request. In another example, raising an error at 940 may include notifying a security manager or privileged user that an inappropriate data manipulation has been requested.

Figure 2:
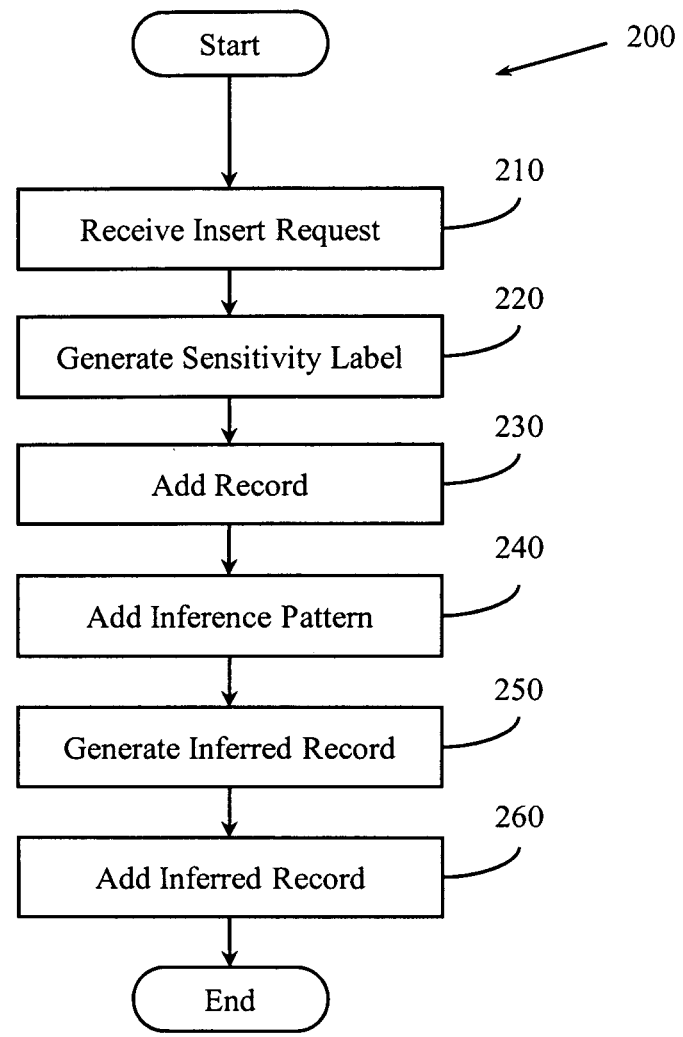
FIG. 2 illustrates one embodiment of a method associated with RDF security.

FIG. 2 illustrates one embodiment of a method 200 associated with RDF security. Method 200 includes several actions similar to those described in connection with method 100 (FIG. 1). For example, method 200 includes receiving an insert request at 210, generating a sensitivity label at 220, and adding a record at 230. However, method 200 includes additional actions.

Method 200 includes, at 240, adding an inference pattern to the RDF database. An inference pattern may describe a set of conditions that, if satisfied by one or more records, allow one or more additional records to be derived. For example, if a triple in a first record identifies John as the child of Jane, and a triple in a second record identifies Jane as the sister of Sandra, a triple could be derived identifying Sandra as the aunt of John. Method 200 also includes, at 250, generating an inferred triple. Generating the inferred triple may include selecting an inferred subject value from a value from a triple in a first RDF record or a value identified by the inference pattern. Generating the inferred triple may also include selecting an inferred predicate value from a value from a triple in a second RDF record or a value identified by the inference pattern. Generating the inferred triple may also include selecting an inferred object value from a value from a triple in a third RDF record or a value identified by the inference pattern. The first record, the second record, and/or the third record, may be the same record.

Generating the inferred triple may also include selecting an inferred sensitivity label based on a sensitivity guideline identified by the inference pattern. In one example, the sensitivity guideline may identify one of, a sensitivity label, a sensitivity label associated with the inferred subject value, a sensitivity label associated with the inferred predicate value, a sensitivity label associated with the inferred object value, a sensitivity label associated with the inference pattern, and so on. In another example, the sensitivity guideline may identify a heuristic for selecting a sensitivity label from a set of sensitivity labels identified by the sensitivity guideline. The sensitivity guideline may, for example, identify a heuristic that causes the most or least restrictive sensitivity label from the set of sensitivity labels identified to be selected. The heuristic may be implemented by a security administrator using an extensible framework to receive sensitivity labels for inferred triple components and to create a sensitivity label for the inferred triple. The heuristic may generate a unique sensitivity label that is different from a sensitivity label associated with the inference pattern, a sensitivity label associated with the inferred subject value, a sensitivity label associated with the inferred predicate value, a sensitivity label associated with the inferred object value, and a sensitivity label associated with a record from which an element of the inferred record is derived. Method 200 also includes, at 260, adding a record containing the inferred triple and the inferred sensitivity label to the RDF database.

Figure 3:
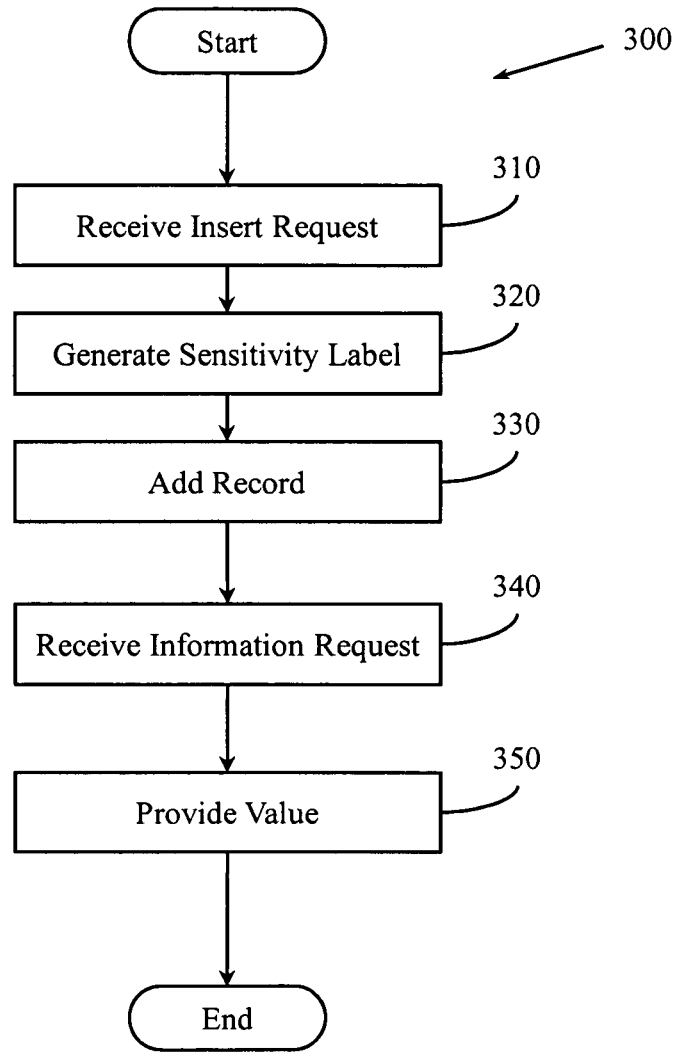
FIG. 3 illustrates one embodiment of a method associated with RDF security.

FIG. 3 illustrates one embodiment of a method 300 associated with RDF security. Method 300 includes several actions similar to those described in connection with method 100 (FIG. 1). For example, method 300 includes receiving an insert request at 310, generating a sensitivity label at 320, and selectively adding a record at 330. However, method 300 includes additional actions.

Method 300 includes, at 340, receiving an information request. The information request may seek information associated with a selected record. The information request may be received from a requesting entity. The requesting entity may be associated with an access label that controls what information is available to the entity. The information request may identify the selected record in the RDF database. The information request may use a query language that is configured to operate with the RDF data model (e.g., SPARQL). The selected record may include a selected triple comprising a selected subject value, a selected predicate value, and a selected object value. The selected predicate value may describe a relationship between the selected subject value and the selected object value. The selected record may also include a sensitivity label with which the selected triple is associated. Method 300 also includes, at 350, providing the selected subject value, the selected predicate value, and/or the selected object value to the requesting entity. The providing at 350 may be performed upon determining that an access label associated with the requesting entity satisfies a security standard determined by a sensitivity label associated with the triple. Thus, if John were to request information regarding his credit card number, a check would be made to determine if John has sufficient privileges to view the information. Based on whether John had the proper authorization to view the information, information regarding his credit card number may then be provided to him. Selective providing is described in greater detail below.

Figure 4:
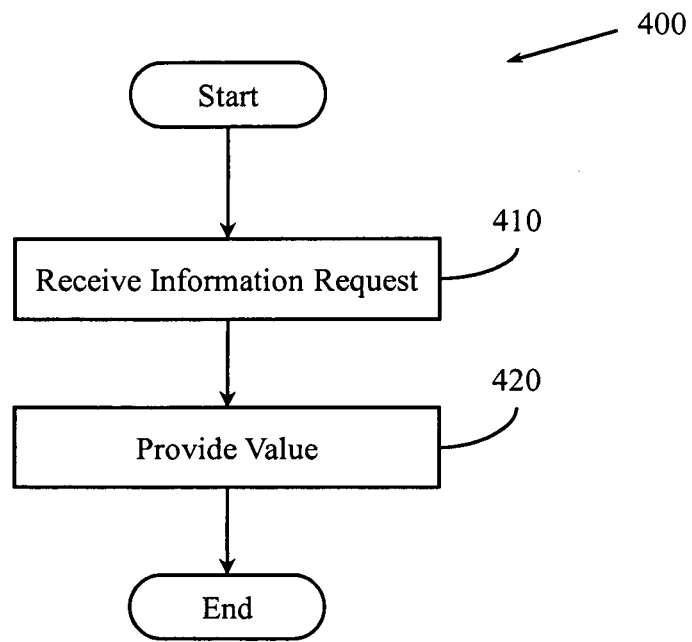
FIG. 4 illustrates one embodiment of a method associated with RDF security.

FIG. 4 illustrates one embodiment of a method 400 associated with RDF security. Method 400 includes, at 410, receiving, an information request identifying a record in an RDF database. The information request may be received from an entity. The entity may be a user or a logic. The record may include a triple comprising a subject value, a predicate value, and an object value. The predicate value may describe a relationship between the subject value and the object value.

Method 400 also includes, at 420, providing the subject value, the predicate value, and/or the object value to the entity. The providing at 420 may be performed upon determining that an access label associated with the entity satisfies a security standard determined by a sensitivity label associated with the triple. In one example, the record may include the sensitivity label. In this example, the sensitivity label may have been previously computed and stored in the record containing the triple. In another example, the sensitivity label may be generated at the time of the request based on sensitivity labels associated with components of the triple.

Figure 5:
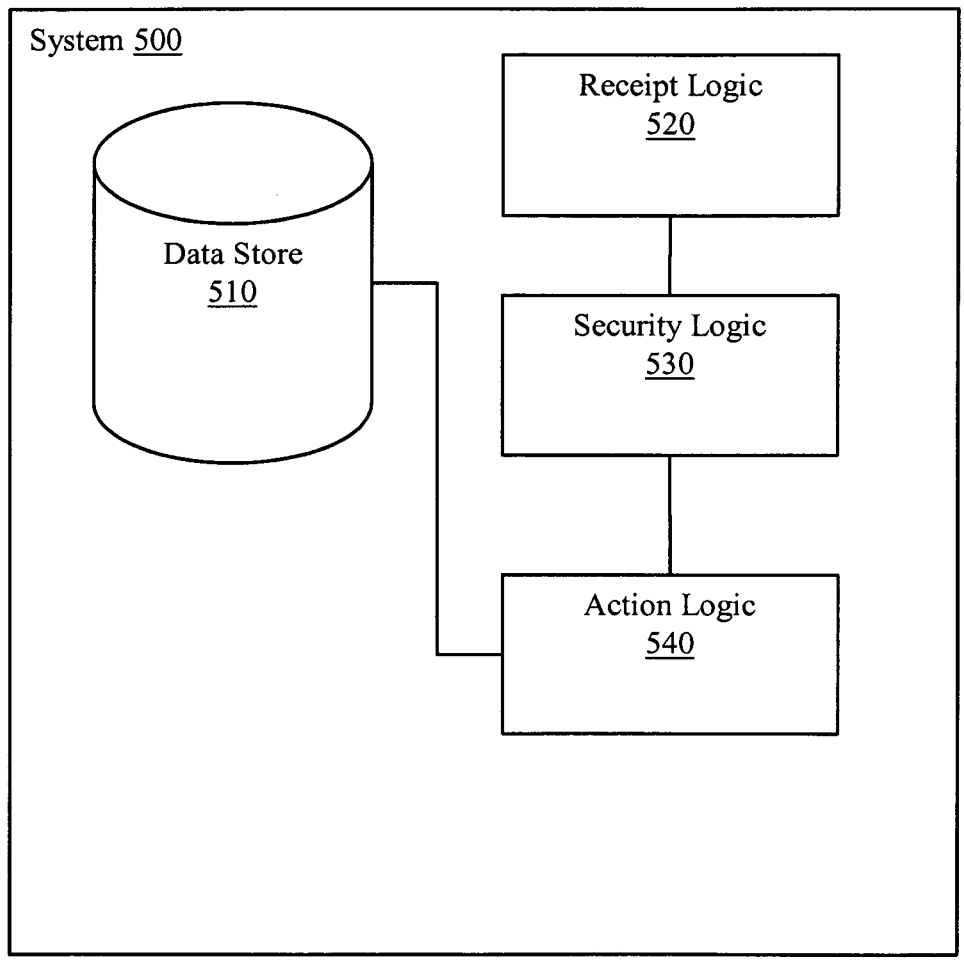
FIG. 5 illustrates one embodiment of a system associated with RDF security.

FIG. 5 illustrates one embodiment of a system 500 associated with resource description framework (RDF) security. System 500 includes a data store 510 to store a set of RDF records. An RDF record may include a triple comprising a subject value, a predicate value, and an object value. The predicate value may describe a relationship between the subject value and the object value. System 500 also includes a receipt logic 520 to receive an action request associated with an RDF record. The action request may be received from an entity. The action request may identify an action to be performed on the RDF record. The entity may be a user or a logic. For example, John may request that his credit card number be modified in the database. In another example John may seek information relating to several records in the database that identify him as a value.

System 500 also includes a security logic 530. Security logic 530 may determine if the entity meets a security standard that authorizes the entity to request the action identified by the action request. In one example security logic 530 may determine if the entity meets the security standard by comparing a sensitivity label associated with a triple contained in the RDF record to an access label associated with the entity. This may result in the creation of a permission value that may be examined by a logic to determine if performing the action is authorized. In one example, the sensitivity label may have been previously generated and stored in the RDF record. The sensitivity label may have been previously generated based on sensitivity labels associated with components of the triple and stored in the record. In another example, the sensitivity label may be generated when the action request is received. System 500 also includes an action logic 540. Action logic 540 may selectively perform the action identified by the action request. The selective performance of the action by action logic 540 may be controlled by the permission value generated by security logic 530. In one example, the action may be adding an RDF record to the RDF data store. In another example, the action may be providing a portion of an RDF record to the entity from the data store. Thus, when the receipt logic 520 receives an action request from an entity, security logic 530 may compare an access label associated with the entity to a sensitivity label(s) associated with components of a triple associated with an RDF record identified by the action request. If security logic 530 determines that the user does not meet a security standard identified by the sensitivity label(s), an action identified by the action request may not be performed.

Figure 6:
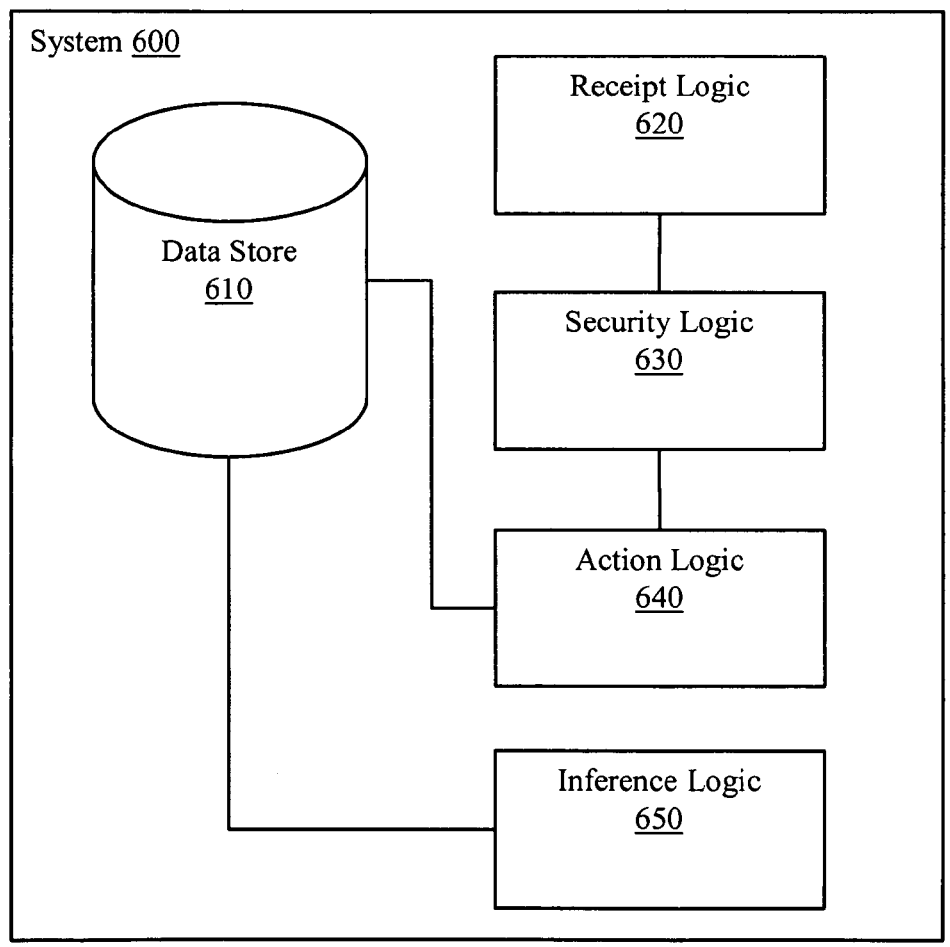
FIG. 6 illustrates one embodiment of a system associated with RDF security.

FIG. 6 illustrates one embodiment of a system 600 associated with RDF security. System 600 includes several items similar to those described in connection with system 500 (FIG. 5). For example, system 600 includes a data store 610 to store RDF records, a receipt logic 620 to receive an action request from an entity, a security logic 630 to determine if the entity meets a security standard, and an action logic 640 to selectively perform an action. However, system 600 includes an additional element.

System 600 includes an inference logic 650. Inference logic 650 may generate an inferred record upon determining that a record in data store 610 completes an inference pattern. An inference pattern describes a set of conditions that, if held by one or more records, allow one or more additional records to be derived. Recall that a first triple describing a relationship between John and Jane, and a second triple describing a relationship between Jane and Sandra, may allow a triple describing a relationship between John and Sandra to be derived. Generating the inferred record may include selecting an inferred subject value from a value from a first record or a vale identified by the inference pattern. Generating the inferred record may also include selecting an inferred predicate value from a value from a second record or a value identified by the inference pattern. Generating the inferred record may also include selecting an inferred object value from a value from a third record or a value identified by the inference pattern. Thus, an inferred triple may be generated. The first record, the second record, and/or the third record may be the same record. Generating the inferred triple may also include selecting or generating an appropriate sensitivity label for the inferred record based on a security guideline identified by the inference pattern. As described above, the security guideline may identify a sensitivity label associated with one of the components of the inferred triple, and so on. Recall that the security guideline may identify a heuristic for selecting or generating a sensitivity label from a set of sensitivity labels identified by the security guideline.

Figure 7:
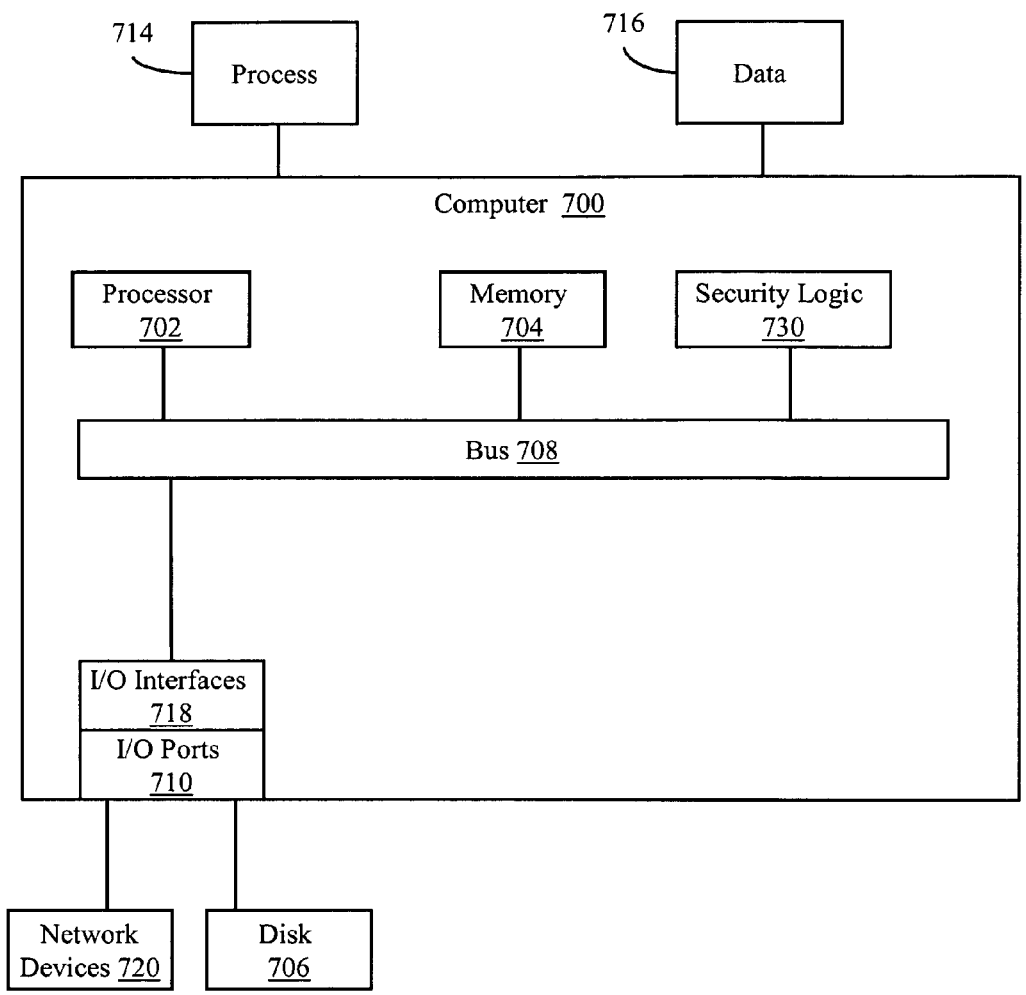
FIG. 7 illustrates one embodiment of a computing environment in which example systems and methods, and equivalents, may operate.

FIG. 7 illustrates one embodiment of a computing device in which example systems and methods described herein, and equivalents, may operate. The example computing device may be a computer 700 that includes a processor 702, a memory 704, and input/output ports 710 operably connected by a bus 708. In one example, the computer 700 may include a security logic 730. In different examples, the security logic 730 may be implemented in hardware, software, firmware, and/or combinations thereof. While the security logic 730 is illustrated as a hardware component attached to the bus 708, it is to be appreciated that in one example, the security logic 730 could be implemented in the processor 702.

Thus, security logic 730 may provide means (e.g., hardware, software, firmware) for storing a set of resource description framework (RDF) records. Security logic 730 may also provide means (e.g., hardware, software, firmware) for receiving an action request associated with an RDF record. Security logic 730 may also provide means (e.g., hardware, software, firmware) for performing an action identified by the action request upon determining that a access label associated with the action request satisfies a security standard associated with the RDF record. The action may be one of, storing the RDF record and providing a piece of information associated with the RDF record. The means associated with security logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM drive, a Blu-Ray drive, an HD-DVD drive, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that are executable by at least a hardware processor of a computing device, the computer-executable instructions comprising instructions for:
   receiving, from an entity, an insert request identifying a subject value, a predicate value, and an object value, where the predicate value describes a relationship between the subject value and the object value;
   generating a triple sensitivity label based, at least in part, on one or more of, a sensitivity label associated with the subject value, a sensitivity label associated with the predicate value, and a sensitivity label associated with the object value;

adding a record to a resource description framework (RDF) database upon determining that an access label associated with the entity satisfies a security standard, the added record including the triple sensitivity label and a triple comprising the subject value, the predicate value, the object value; and upon determining that the added record completes an inference pattern in the RDF database:
generating an inferred triple, and
adding an inferred record including the inferred triple to the RDF database, where an inference pattern describes a set of properties that, if matched by one or more records, allow one or more additional records to be derived.

2. The non-transitory computer-readable medium of claim 1, where the sensitivity label associated with the subject value, the sensitivity label associated with the predicate value, and the sensitivity label associated with the object value are obtained from a sensitivity label data store, where the sensitivity label data store associates sensitivity labels with values in the RDF database that are not sensitivity labels.

3. The non-transitory computer-readable medium of claim 1, where generating the triple sensitivity label includes selecting one of, the sensitivity label associated with the subject value, the sensitivity label associated with the predicate value, and the sensitivity label associated with the object value.

4. The non-transitory computer-readable medium of claim 3, where generating the triple sensitivity label includes selecting one of, the sensitivity label associated with the subject value, the sensitivity label associated with the predicate value, and the sensitivity label associated with the object value, that is the most restrictive security.

5. The non-transitory computer-readable medium of claim 1, where generating the triple sensitivity label includes combining one or more of, a portion of the sensitivity label associated with the subject value, a portion of the sensitivity label associated with the predicate value, and a portion of the sensitivity label associated with the object value.

6. The non-transitory computer-readable medium of claim 1, where generating the triple sensitivity label includes combining one or more of, a portion of the sensitivity label associated with the subject value, a portion of the sensitivity label associated with the predicate value, and a portion of the sensitivity label associated with the object value that provide the triple sensitivity label the most restrictive security.

7. The non-transitory computer-readable medium of claim 1, where the added record is added to the RDF database by one of, inserting the added record into the RDF database, and updating a record in the RDF database.

8. The non-transitory computer-readable medium of claim 1, where the instructions include instructions for:
adding the inference pattern to the RDF database.

9. The non-transitory computer-readable medium of claim 1, where generating the inferred triple includes instructions for:
selecting an inferred subject value from one of, a value from a triple in a first RDF record, and a value identified by the inference pattern;
selecting an inferred predicate value from one of, a value from a triple in a second RDF record, and a value identified by the inference pattern;
selecting an inferred object value from one of, a value from a triple in a third RDF record, and a value identified by the inference pattern; and
selecting an inferred sensitivity label based on a security guideline identified by the inference pattern.

10. The non-transitory computer-readable medium of claim 9, where the security guideline identifies one of:
a sensitivity label associated with the inference pattern,
a sensitivity label associated with the inferred subject value,
a sensitivity label associated with the inferred predicate value,
a sensitivity label associated with the inferred object value,
a sensitivity label associated with a record from which an element of the inferred record is derived;
a heuristic for generating a sensitivity label based, at least in part, on one or more of a sensitivity label associated with the inference pattern, a sensitivity label associated with the inferred subject value, a sensitivity label associated with the inferred predicate value, a sensitivity label associated with the inferred object value, and a sensitivity label associated with a record from which an element of the inferred record is derived.

11. The non-transitory computer readable medium of claim 10, where the heuristic is implemented by a security administrator using an extensible framework to receive sensitivity labels for inferred triple components and to create a sensitivity label for the inferred triple.

12. The non-transitory computer readable medium of claim 10, where the heuristic generates a unique sensitivity label that is different from a sensitivity label associated with the inference pattern, a sensitivity label associated with the inferred subject value, a sensitivity label associated with the inferred predicate value, a sensitivity label associated with the inferred object value, and a sensitivity label associated with a record from which an element of the inferred record is derived.

13. The non-transitory computer-readable medium of claim 1, where the instructions include instructions for:
receiving, from a requesting entity, an information request identifying a selected record in the RDF database, the selected record including a selected triple comprising a selected subject value, a selected predicate value, and a selected object value, where the selected predicate value describes a relationship between the selected subject value and the selected object value; and
selectively providing access to the selected record for the requesting entity upon determining that an access label associated with the requesting entity satisfies a security standard determined by a sensitivity label associated with the selected triple.

14. A method, comprising:
receiving, from an entity, an insert request identifying a subject value, a predicate value, and an object value, where the predicate value describes a relationship between the subject value and the object value;
generating, by at least a processor, a triple sensitivity label based, at least in part, on a sensitivity label associated with the subject value, a sensitivity label associated with the predicate value, and a sensitivity label associated with the object value;
adding, by at least a processor, a record to a resource description framework (RDF) database upon determining that an access label associated with the entity satisfies a security standard, the added record including the triple sensitivity label and a triple comprising the subject value, the predicate value, the object value; and upon determining that the added record completes an inference pattern in the RDF database:
  generating an inferred triple; and
    adding an inferred record including the inferred triple to the RDF database, where an inference pattern describes a set of properties that, if held by one or more records, allow one or more additional records to be derived.

15. The method of claim 14, where the sensitivity label associated with the subject value, the sensitivity label associated with the predicate value, and the sensitivity label associated with the object value are obtained from a sensitivity label data store, where the sensitivity label data store associates sensitivity labels with values in the RDF database that are not sensitivity labels, and where generating the triple sensitivity label includes selecting one of, the sensitivity label associated with the subject value, the sensitivity label associated with the predicate value, and the sensitivity label associated with the object value, that is the most restrictive security.

16. The method of claim 14, where generating the triple sensitivity label includes combining one or more of, a portion of the sensitivity label associated with the subject value, a portion of the sensitivity label associated with the predicate value, and a portion of the sensitivity label associated with the object value that provide the triple sensitivity label the most restrictive security.

17. The method of claim 14, where generating the inferred triple includes:
  selecting an inferred subject value from one of, a value from a triple in a first RDF record, and a value identified by the inference pattern;
  selecting an inferred predicate value from one of, a value from a triple in a second RDF record, and a value identified by the inference pattern;
  selecting an inferred object value from one of, a value from a triple in a third RDF record, and a value identified by the inference pattern; and
  selecting an inferred sensitivity label based on a security guideline identified by the inference pattern.

18. The method of claim 17, where the security guideline identifies one of:
  a sensitivity label associated with the inference pattern,
  a sensitivity label associated with the inferred subject value,
  a sensitivity label associated with the inferred predicate value,
  a sensitivity label associated with the inferred object value,
  a sensitivity label associated with a record from which an element of the inferred record is derived;
  a heuristic for generating a sensitivity label based, at least in part, on one or more of a sensitivity label associated with the inference pattern, a sensitivity label associated with the inferred subject value, a sensitivity label associated with the inferred predicate value, a sensitivity label associated with the inferred object value, and a sensitivity label associated with a record from which an element of the inferred record is derived.

19. The method of claim 14, comprising:
  adding the inference pattern to the RDF database;
  receiving, from a requesting entity, an information request identifying a selected record in the RDF database, the selected record including a selected triple comprising a selected subject value, a selected predicate value, and a selected object value, where the selected predicate value describes a relationship between the selected subject value and the selected object value; and
  selectively providing access to the selected record for the requesting entity upon determining that an access label associated with the requesting entity satisfies a security standard determined by a sensitivity label associated with the selected triple.

20. A system, comprising:
  receipt logic configured to receive, from an entity, an insert request identifying a subject value, a predicate value, and an object value, wherein the predicate value describes a relationship between the subject value and the object value;
  sensitivity logic configured to generate a triple sensitivity label based, at least in part, on a sensitivity label associated with the subject value, a sensitivity label associated with the predicate value, and a sensitivity label associated with the object value;
  action logic configured to add a record to a resource description framework (RDF) database upon determining that an access label associated with the entity satisfies a security standard, the added record including the triple sensitivity label and a triple comprising the subject value, the predicate value, the object value; and
  an inference logic to, upon determining that an RDF record in the data store completes an inference pattern, generate an inferred RDF record that includes an inferred triple, and add the inferred RDF record into the data store, where an inference pattern describes a set of properties that, if matched by one or more RDF records, allow one or more additional RDF records to be derived.

* * * * *